US009483465B2

(12) United States Patent
Nuggehalli

(10) Patent No.: US 9,483,465 B2
(45) Date of Patent: Nov. 1, 2016

(54) LANGUAGE TRANSLATION FOR MULTI-FUNCTION PERIPHERALS

(71) Applicant: Jayasimha Nuggehalli, Sunnyvale, CA (US)

(72) Inventor: Jayasimha Nuggehalli, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/640,896

(22) Filed: Mar. 6, 2015

(65) Prior Publication Data
US 2016/0259781 A1    Sep. 8, 2016

(51) Int. Cl.
*G06F 17/28* (2006.01)
(52) U.S. Cl.
CPC ......... *G06F 17/2827* (2013.01); *G06F 17/289* (2013.01)
(58) Field of Classification Search
CPC .................................................. G06F 17/2827
See application file for complete search history.

(56) References Cited

U.S. PATENT DOCUMENTS

| 6,917,920 | B1 * | 7/2005 | Koizumi | G10L 15/10 704/2 |
| 2005/0131673 | A1 * | 6/2005 | Koizumi | G10L 15/10 704/2 |
| 2006/0100847 | A1 * | 5/2006 | McEntee | G06F 17/2247 704/4 |
| 2007/0118351 | A1 * | 5/2007 | Sumita | G06F 17/2827 704/2 |
| 2007/0208553 | A1 * | 9/2007 | Hastings | G06F 17/28 704/2 |
| 2009/0222256 | A1 * | 9/2009 | Kamatani | G06F 17/2827 704/2 |
| 2014/0006005 | A1 * | 1/2014 | Hasunuma | G06F 17/289 704/2 |

* cited by examiner

*Primary Examiner* — Douglas Godbold
(74) *Attorney, Agent, or Firm* — Hickman Palermo Becker Bingham LLP; Edward A. Becker

(57) ABSTRACT

An approach provides context-specific language translation services for electronic documents using templates. As used herein, the term "template" refers to a context-specific set of keywords that includes at least a first set of keywords in a first language and a corresponding second set of keywords in a second language that is different than the first language. As used herein, the term "language" refers to a human language and the term "keyword" refers to one or more words or phrases of any length. The context-specific set of keywords may include additional sets of keywords in other languages that correspond to the first and second sets of keywords. A language translation service uses the templates to translate electronic documents. The language translation service also provides capabilities for managing templates and a translation review capability for reviewing translated documents to identify errors. Templates can then be edited to address the translation errors.

20 Claims, 20 Drawing Sheets

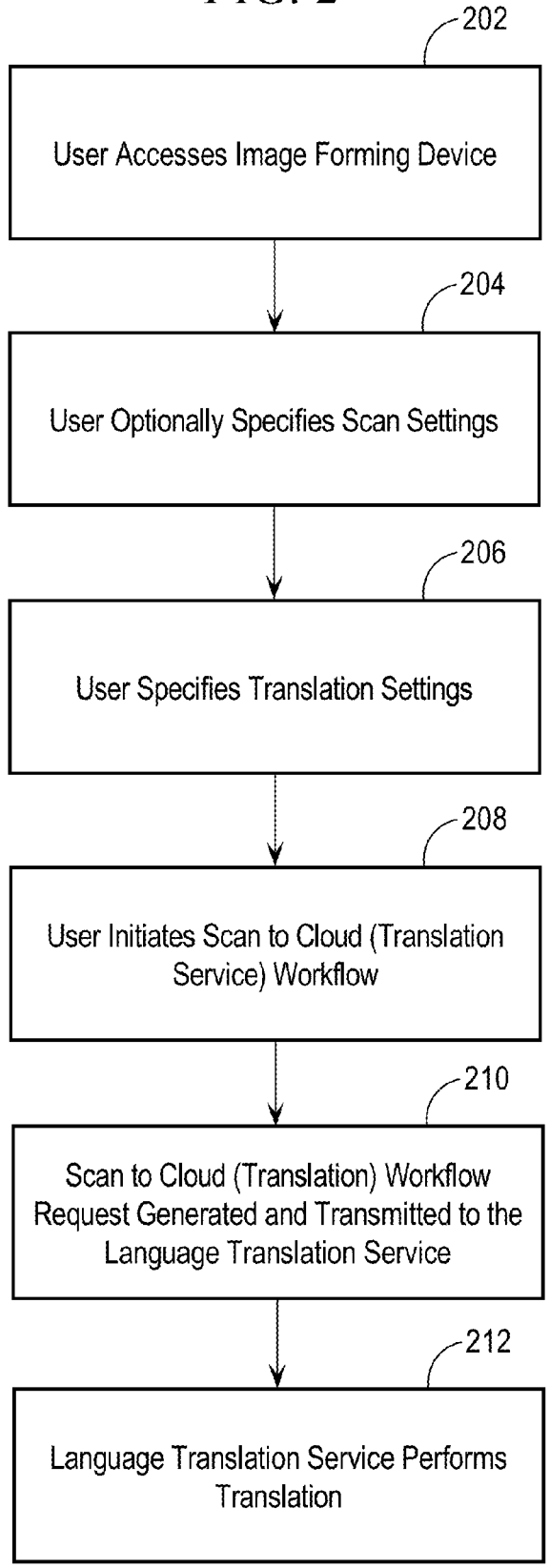

| Row | Language #1 | Language #2 | Language #3 |
|-----|-------------|-------------|-------------|
| 1 | A1 | A2 | A3 |
| 2 | B1 | B2 | B3 |
| 3 | C1 |    | C3 |
| 4 | D1 | D2 |    |
| 5 | E1 | E2 |    |
| 6 |    | F2 | F3 |
| 7 | G1 | G2 | G3 |

FIG. 5B

| Language Translation Service | | | | |
|---|---|---|---|---|
| | New | Edit | Delete | More Options |
| Translation Templates | Template Name | | Owner | Last Modified |
| Translation Review | Manual | | me | Aug 24 |
| Administration | Design Documents | | me | Sep 10 |
| | Medical Records | | me | Jan 25 |
| | Specification | | me | Oct 10 |

520

Language Translation Service

| | Template Name: Design Document | | |
|---|---|---|---|
| 526 | English | German | French |
| Translation Templates | data design | Datendesign | conception de donnees |
| Translation Review | architecture design | conception de l'architecture | conception de l'architecture |
| Administration | interface design | Interface-Design | conception de l'interface |
| | procedural design | Verfahrens Design | conception procedurale |
| | 542 | 544 | 546 |

Keyword Edit Controls

[ New ]  [ Edit ]  [ Delete ]  [ Done ]

Language Translation Service

Translation Review — 602

| Title | OWNER | Last Modified |
|---|---|---|
| ICE design doc | me | Jan 7 |
| ICE White Paper | Bob | Feb 2 |
| ICE Design Review | Tim | Dec 12 |
| Scan to Cloud Specification | me | Mar 1 |

526
- Translation Templates
- Translation Review
- Administration

[Review] — 604

600

LANGUAGE TRANSLATION FOR MULTI-FUNCTION PERIPHERALS

FIELD OF THE INVENTION

Embodiments relate generally to translating electronic documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Image forming devices often have insufficient computational and storage resources to translate electronic documents from one language to another language. Consequently, translation of electronic documents is typically performed at other network devices or by translation services that have access to more computational and storage resources. One of the disadvantages of current translation services is that they often employ a single translation algorithm that does not provide a high level of accuracy across multiple contexts. In addition, there is often limited ability for end users to customize and/or improve the translation algorithms used by translation services.

SUMMARY

An apparatus comprises one or more processors, one or more memories communicatively coupled to the one or more processors; and a language translation service executing on the apparatus. The language translation service executing on the apparatus is configured to receive a request to translate an electronic document. The request to translate the electronic document specifies that the electronic document is to be translated from a first language to a second language that is different than the first language. The request to translate the electronic document further specifies a particular template from a plurality of templates to be used to translate the electronic document from the first language to the second language. Each template from the plurality of templates corresponds to a different context and the particular template corresponds to a particular context and includes at least a first plurality of keywords in the first language and a corresponding second plurality of keywords in the second language. The language translation service executing on the apparatus is configured to receive a request to translate an generate a translated electronic document by processing the electronic document using the first plurality of keywords in the first language and the corresponding second plurality of keywords in the second language included in the particular template.

BRIEF DESCRIPTION OF THE DRAWINGS

In the figures of the accompanying drawings like reference numerals refer to similar elements.

FIG. 2 is flow diagram that depicts a process for translating electronic documents using templates.

FIG. 4B is a table that depicts example keyword data in the form of a table.

FIG. 5B depicts an example template management screen for managing templates.

FIG. 5D depicts an example template editing screen for viewing and editing an existing template.

FIG. 6A depicts an example translation review screen for performing a translation review.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. OVERVIEW
II. SYSTEM ARCHITECTURE
III. TRANSLATING ELECTRONIC DOCUMENTS USING TEMPLATES
IV. TEMPLATE MANAGEMENT
V. TRANSLATION REVIEW
VI. IMPLEMENTATION MECHANISMS

I. Overview

An approach provides context-specific language translation services for electronic documents using templates. As used herein, the term "template" refers to a context-specific set of keywords that includes at least a first set of keywords in a first language and a corresponding second set of keywords in a second language that is different than the first language. As used herein, the term "language" refers to a human language and the term "keyword" refers to one or more words or phrases of any length. The context-specific set of keywords may include additional sets of keywords in other languages that correspond to the first and second sets of keywords. A language translation service uses the templates to translate electronic documents. The language translation service also provides capabilities for creating, editing and deleting templates. This includes a translation review capability for reviewing translated documents to identify errors. Templates can then be edited to address the translation errors identified during the translation review.

II. System Architecture

Figure 1A:
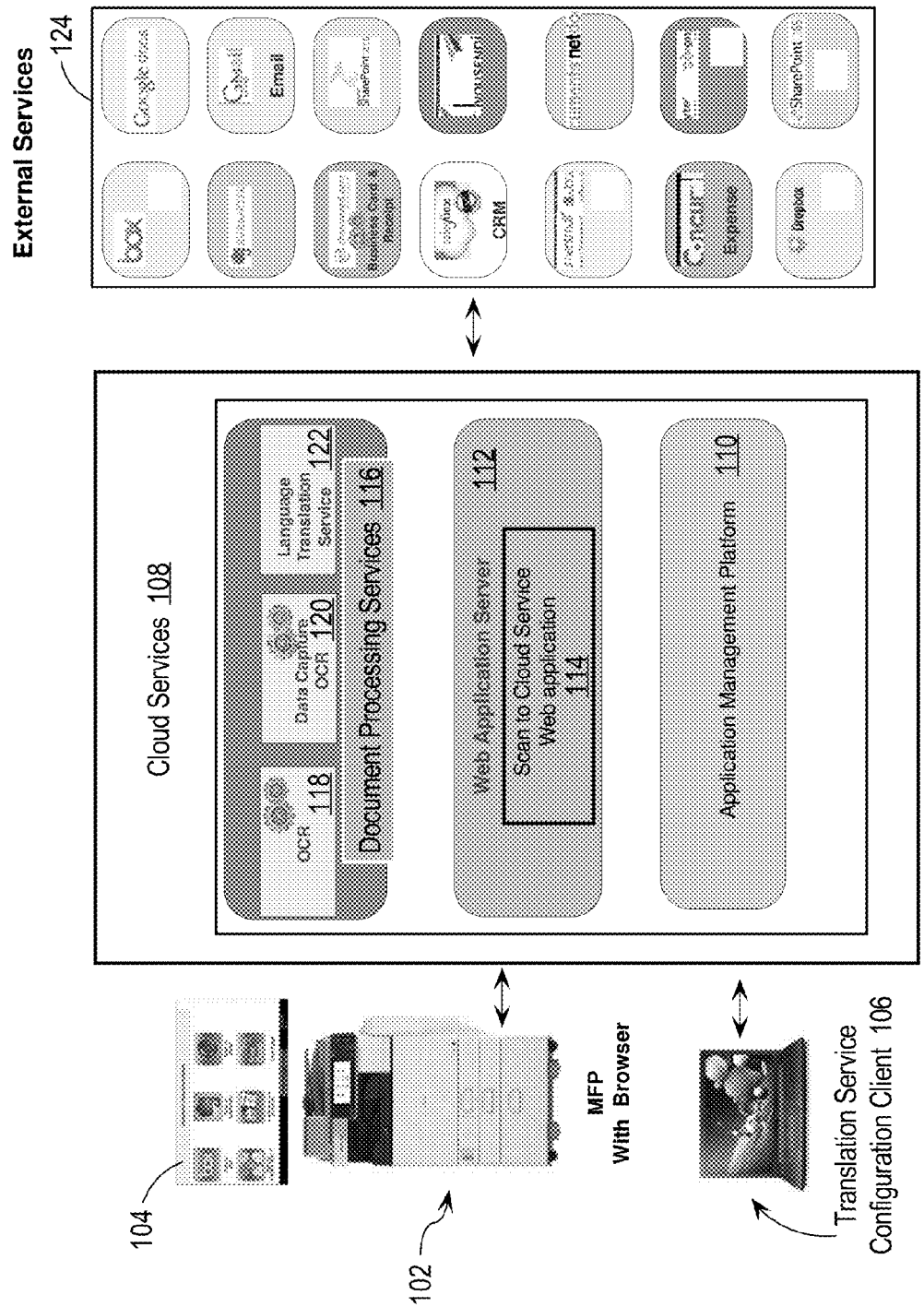
FIG. 1A is a block diagram that depicts an arrangement for translating electronic documents.

FIG. 1A is a block diagram that depicts an arrangement 100 for translating electronic documents. Arrangement 100 includes an image forming device in the form of a multi-function peripheral (MFP) 102 that provides a graphical user interface 104 for users to scan and request translation of printed documents and media. Embodiments are described herein in the context of an MFP 102 for purposes of explanation, but embodiments are not limited to MFPs and are applicable to any type of image forming device. Arrangement 100 includes a translation service configuration client 106 for accessing translation service configuration services that are described in more detail hereinafter. Translation service configuration client 106 may be implemented by any type of client device. Example implementations include without limitation, a smart phone, a camera, a tablet computing device, a personal digital assistant or a laptop computer. Translation service configuration client 106 may include a web browser for accessing and managing configuration data for language translation service 122.

Arrangement 100 includes cloud services 108 that may be hosted, for example, on one or more network elements, such as network servers. In the example depicted in FIG. 1A, cloud services 108 include an application management platform 110 that supports the execution of various application services, such as web application server 112 that includes a scan-to-cloud service web application 114. Cloud services 108 also include document processing services 116, that include optical character recognition (OCR) 118, data capture OCR 120 and language translation service 122. Data capture OCR 120 is configured to identify particular data in OCR data.

Figure 1B:
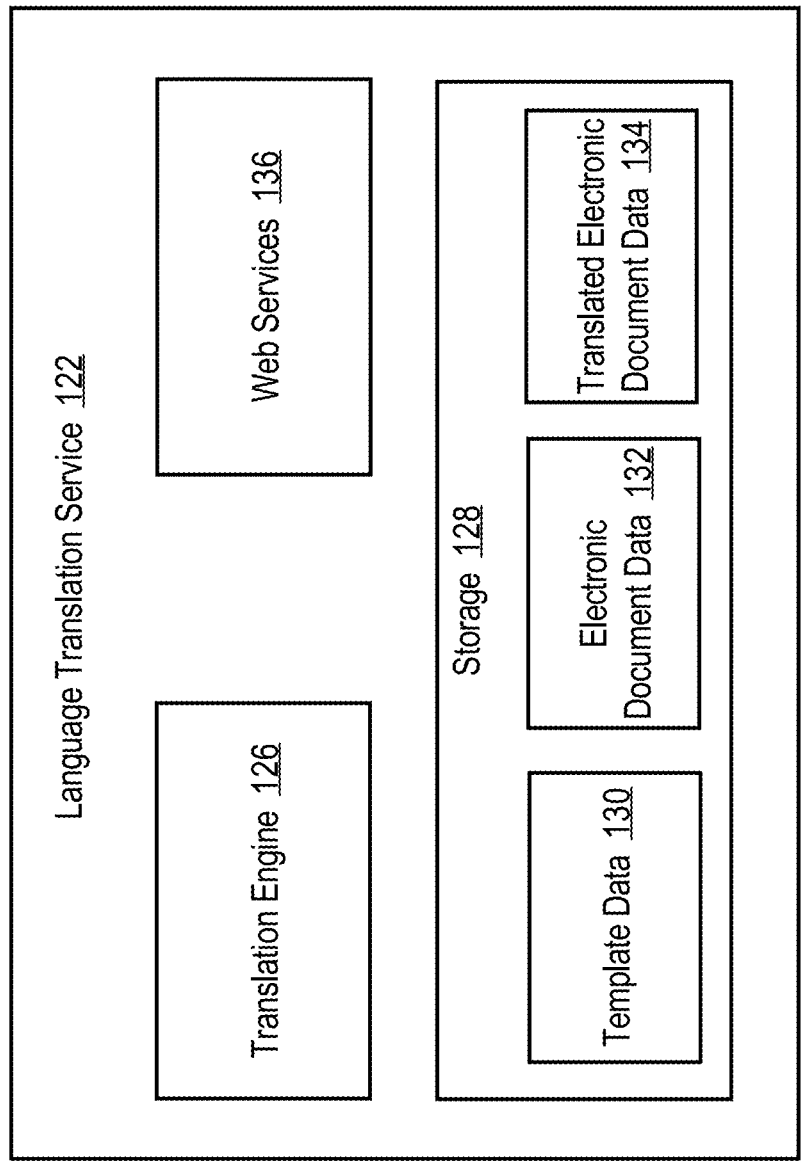
FIG. 1B depicts an example embodiment of a language translation service.

Language translation service 122 translates electronic documents using templates. FIG. 1B depicts an example embodiment of language translation service 122. In this embodiment, language translation service 122 includes a translation engine 126, storage 128, with template data 130, electronic document data 132 and translated electronic document data 134, and web services 136. Storage 128 may be implemented by any type of storage that may vary depending upon a particular implementation and embodiments are not limited to any particular type of storage. Example implementations of storage 128 include, without limitation, volatile storage, non-volatile storage, and any combination of volatile and non-volatile storage. Template data 130 is data that defines templates, as described in more detail hereinafter. Electronic document data 132 is data that represents one or more portions of one or more electronic documents. Thus, electronic document data 132 may represent portions of electronic documents or entire electronic documents. Translated electronic document data 134 is one or more portions of electronic document data 132 that have been translated from one language to another language by the translation engine 126 using templates. Translated electronic document data 134 may represent portions of electronic documents or entire electronic documents that have been translated. Web services 136 provide communication between language translation service 122 and other entities, such as MFP 102 and translation service configuration client 106.

Cloud services 108 may include one or more other services that may vary depending upon a particular implementation. External services 124 include a wide variety of services that may be used in combination with language translation service 122, such as secure storage services, email services, accounting services, etc. The various elements depicted in arrangement 100 may communicate using direct communications links, via one or more networks, or via both direct communications links and one or more networks.

Figure 1C:
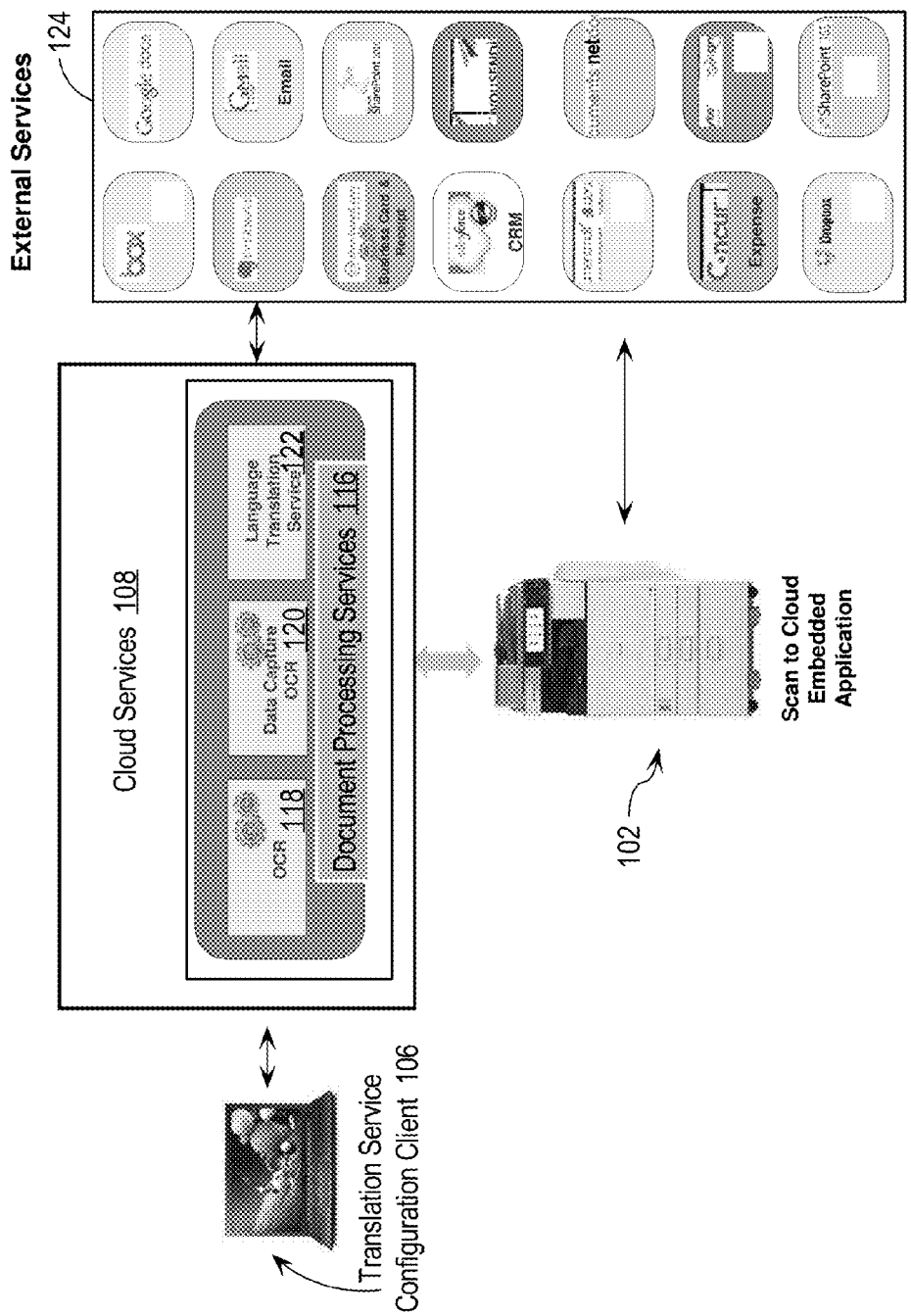
FIG. 1C depicts an MFP configured with a scan-to-cloud embedded application.
Figure 1D:
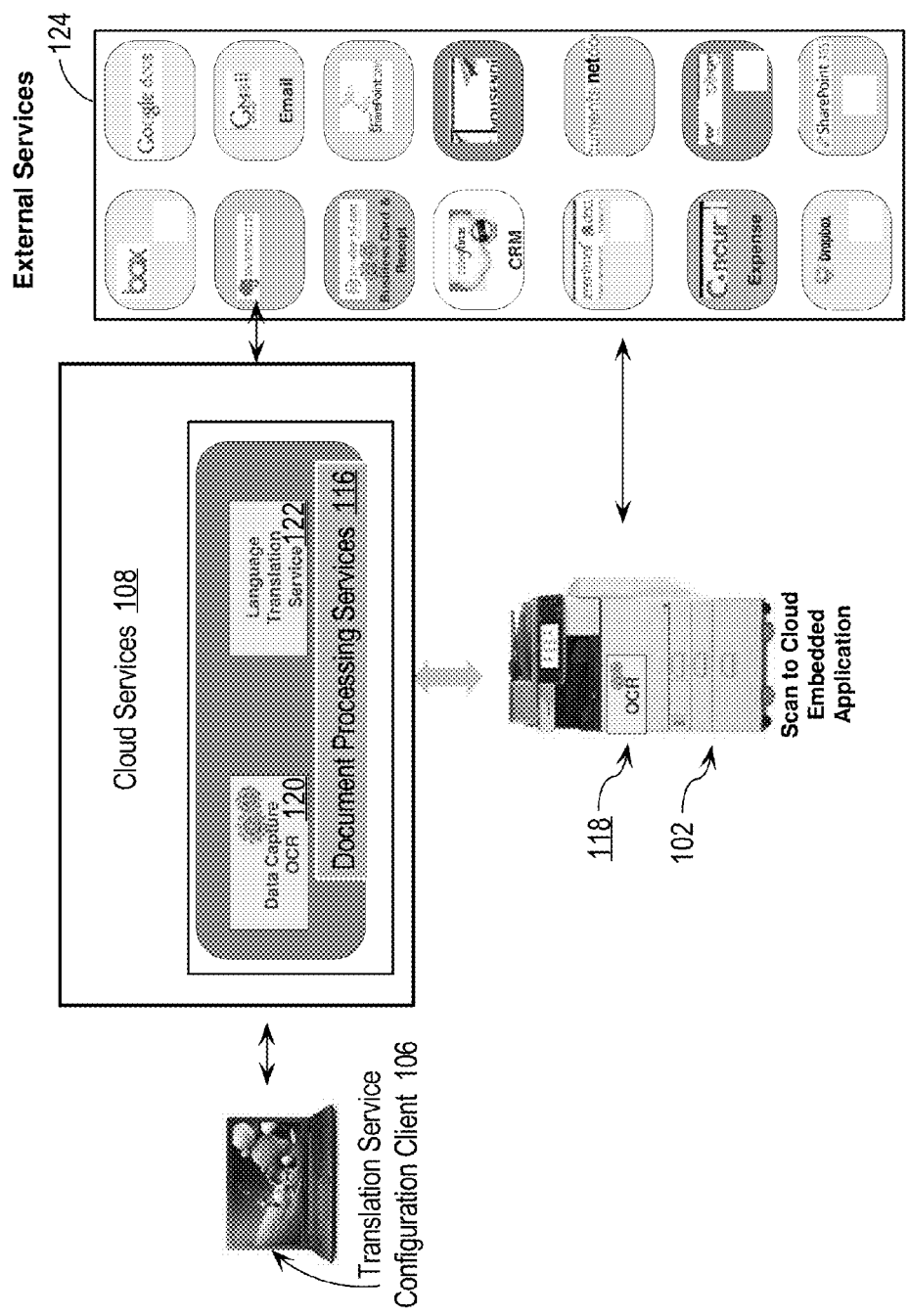
FIG. 1D depicts and OCR process implemented on an MFP.

In arrangement 100, MFP 102 is configured with a web browser that accesses cloud services 108 via scan-to-cloud service web application 114, but many variations may be used that may vary depending upon a particular implementation. For example, in FIG. 1C, MFP 102 is configured with a scan-to-cloud embedded application that provides access by MFP 102 to cloud services 108. In this example, MFP 102 has the elements necessary to support the scan-to-cloud embedded application, for example, an application management platform and/or a web application server. One or more document processing services 116 may be implemented on MFP 102. For example, in FIG. 1D, OCR process 118 is implemented on MFP 102.

III. Translating Electronic Documents Using Templates

Figure 3A:
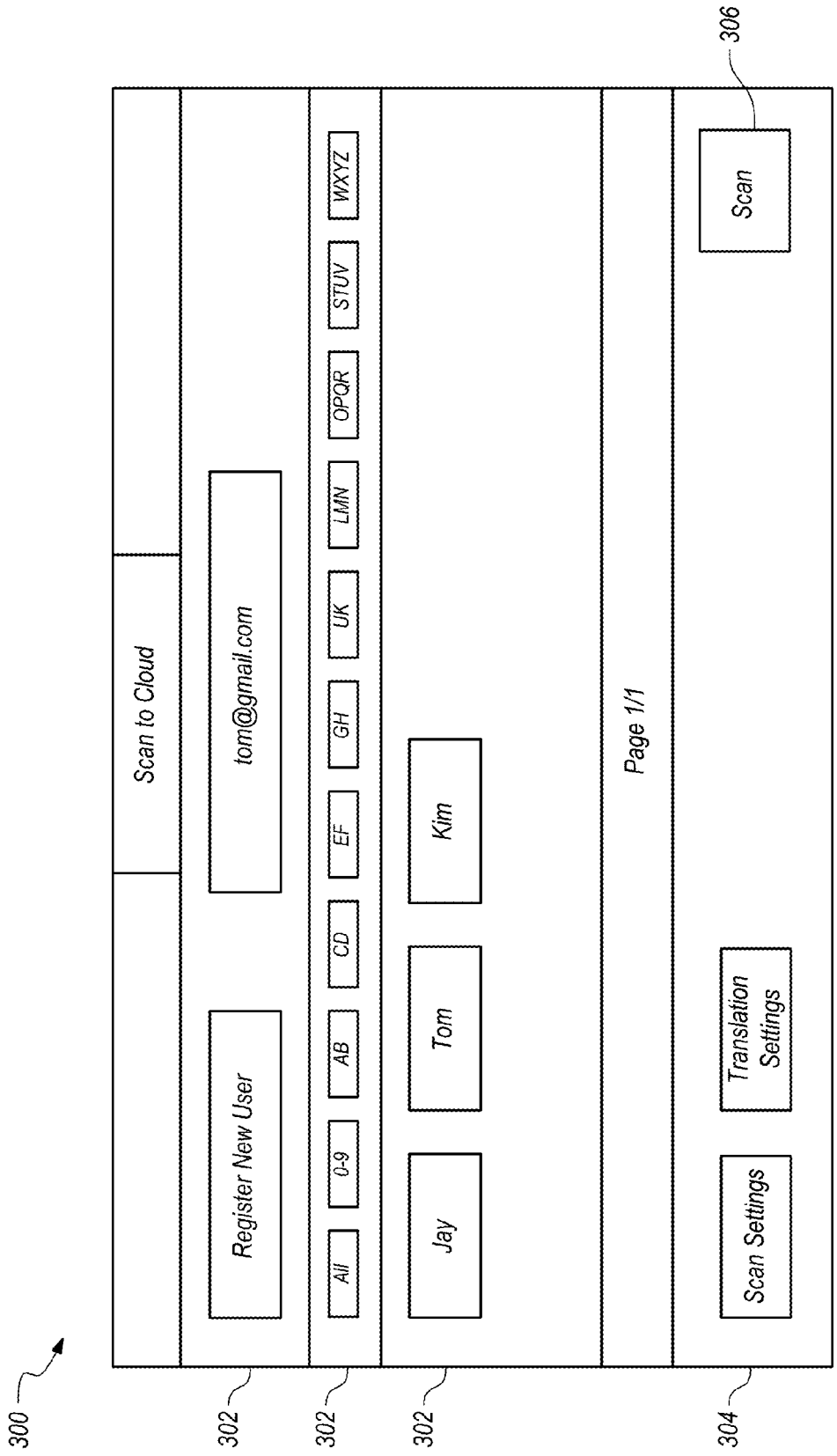
FIG. 3A depicts an example registered users screen generated by an image forming device that provides access to a scan-to-cloud workflow.

FIG. 2 is flow diagram 200 that depicts a process for translating electronic documents using templates. In step 202, a user accesses an image forming device. FIG. 3A depicts an example registered users screen 300 generated by an image forming device, such as MFP 102, that provides access to a scan-to-cloud workflow. For purposes of explanation, embodiments are described hereinafter in the context of MFP 102, but embodiments are not limited to the MFP context and are applicable to any type of image forming device. Access to registered users screen 300 may be conditioned upon successful authentication of the user, depending upon a particular implementation. In the present example, the scan-to-cloud workflow includes scanning a printed document or media at MFP 102, generating scanned document data that represents the printed document or media, processing the scanned document data via OCR process 118 and/or data capture OCR process 120 to generate electronic document data, and processing of the electronic document data by language translation service 122 to generate translated electronic document data.

Registered users screen 300 includes controls 302 for selecting an existing user and registering a new user. Registered users screen 300 includes controls 304 for specifying scan setting and translation settings, and a control 306 for initiating the scan-to-cloud workflow.

Figure 3B:
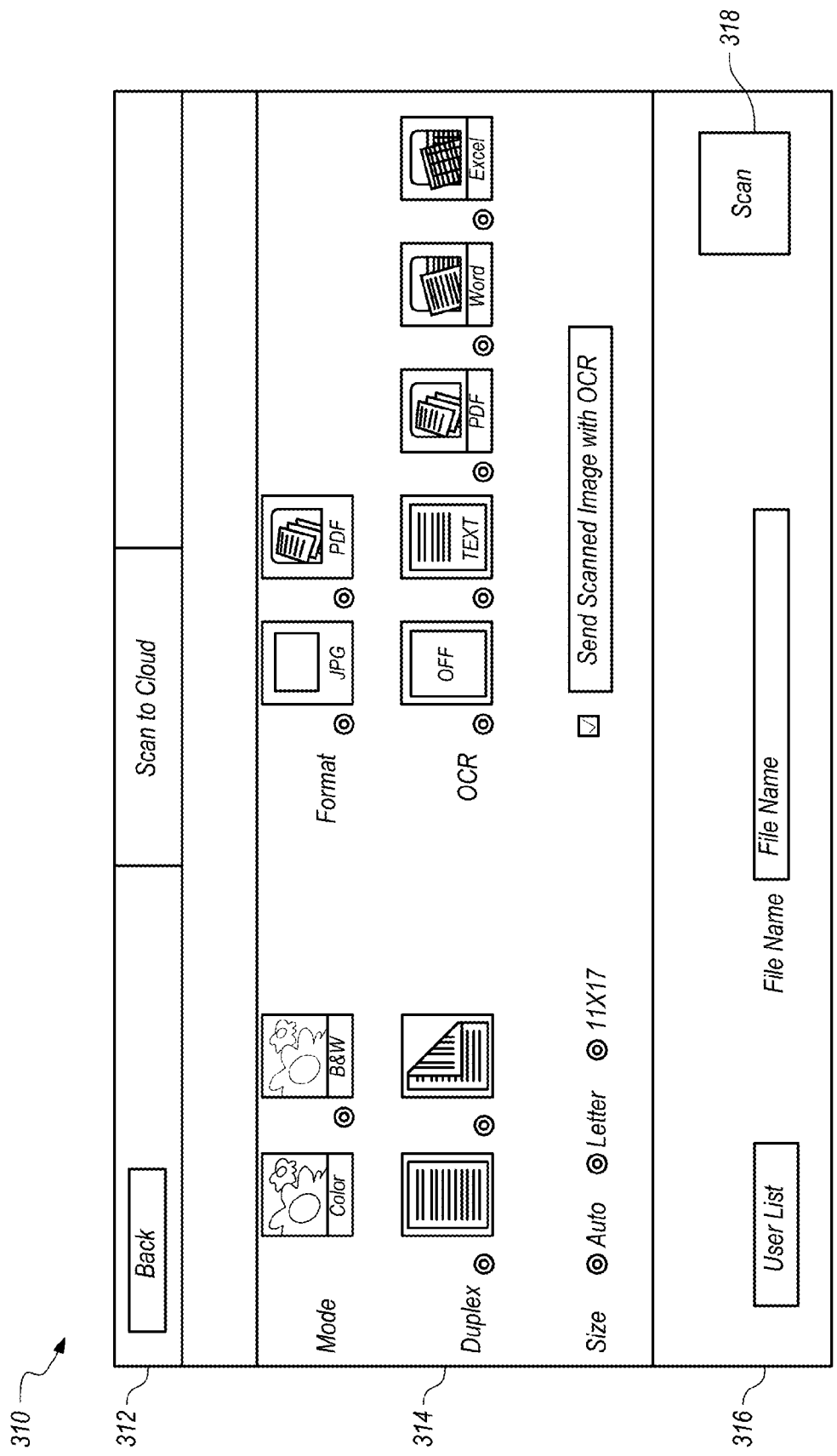
FIG. 3B depicts an example scan settings screen generated by an MFP that allows a user to specify scan settings.

In step 204, the user optionally specifies scan settings. Scan settings are settings pertaining to the scanning of a printed document or medium is scanned by MFP 102. MFP 102 may be configured to use default scan settings that a user may modify and/or supplement with other scan settings. FIG. 3B depicts an example scan settings screen 310 generated by MFP 102 that allows a user to specify scan settings. Scan settings screen 310 may be accessed via selection of the "Scan Settings" control 304 of FIG. 3A.

Scan settings screen 310 includes a control 312 for returning to registered users screen 300 and controls 314 for specifying various scanning settings, such as color/bw, format, duplex, OCR output type, size and whether the scanned image should be sent with the electronic document data generated by the OCR. Scan settings screen 310 includes controls 316, that include a "User List" control for returning to registered users screen 300 and a control "File Name" for specifying a file name for the electronic document data generated by the OCR process. Scan settings screen 310 also includes a control 318 for initiating the scan-to-cloud workflow.

Figure 3C:
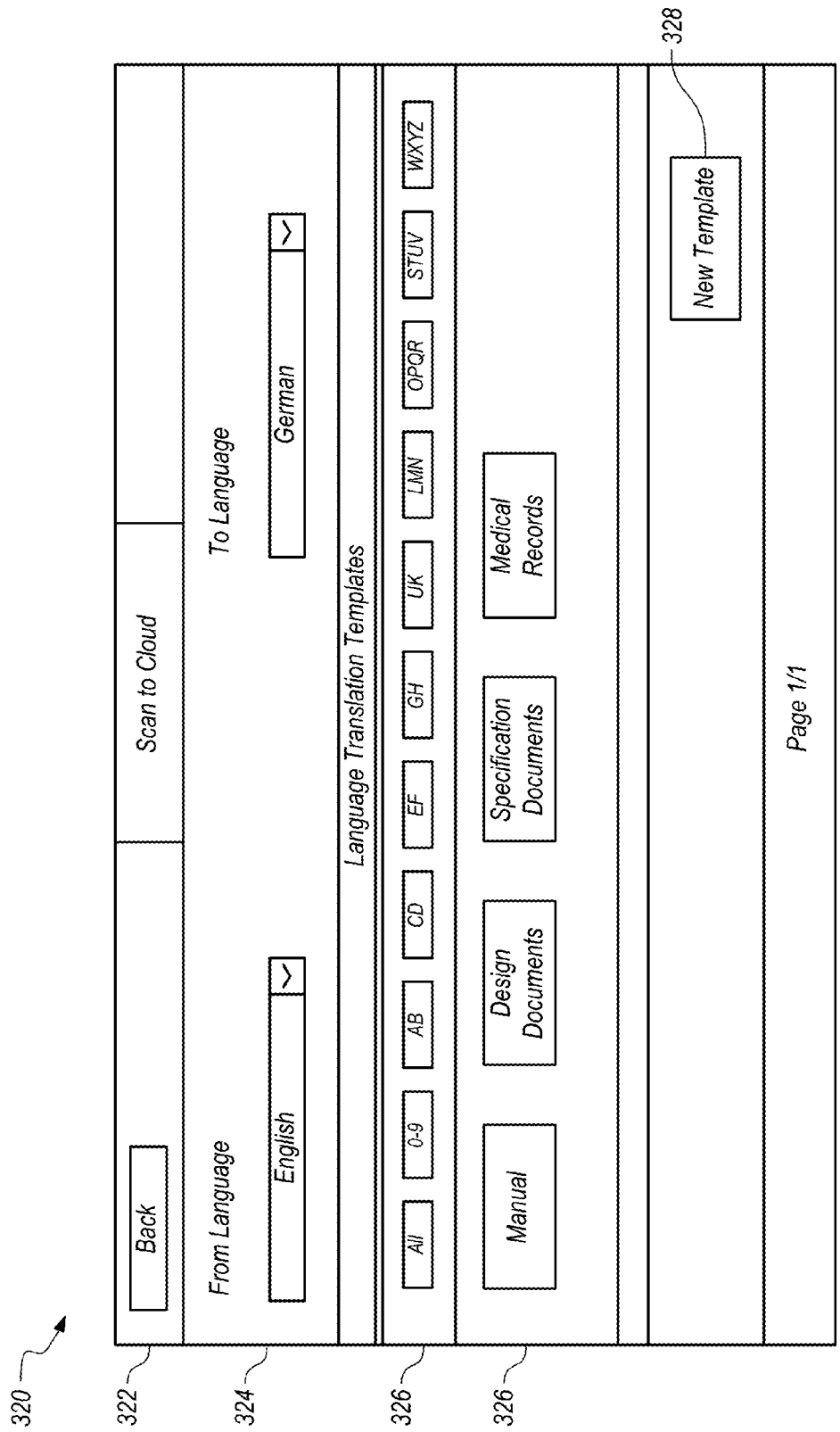
FIG. 3C depicts an example translation settings screen generated by an MFP that allows a user to specify translation settings.

In step 206, the user specifies translation settings that pertain to the translation of electronic document data from one format to another format, e.g., one language to another language. FIG. 3C depicts an example translation settings screen 320 generated by MFP 102 that allows a user to specify translation settings. Translation settings screen 320 may be accessed via selection of the "Translation Settings" control 304 of FIG. 3A.

Translation settings screen 320 includes a control 322 for returning to registered users screen 300 and controls 324 for specifying a source language and a target language. The source language corresponds to the language of words in the electronic document data that will be translated into corresponding words in the target language. Translation settings screen 320 includes controls 326 for specifying a template to be used by language translation service 122 to perform the translation. Each template includes at least a first set of keywords in a first language and a corresponding second set of keywords in a second language that is different than the first language. A template may support translation between more than two languages. For example, a template may include N sets of keywords in N different languages that correspond to each other. The keywords may be specific to a particular context to increase accuracy, since a keyword in one context may have a different translation into a target language than when used in a different context. In FIG. 3C, the templates correspond to a manual context, e.g., technical manuals, a design document context, a specification document context and a medical record context. The context-specific set of keywords may include additional sets of keywords in other languages that correspond to the first and second sets of keywords. MFP 102 may be configured to retrieve template data 130 from language translation service 122. Alternatively, template data 130 may be "pushed" to MFP 102.

Figure 3D:
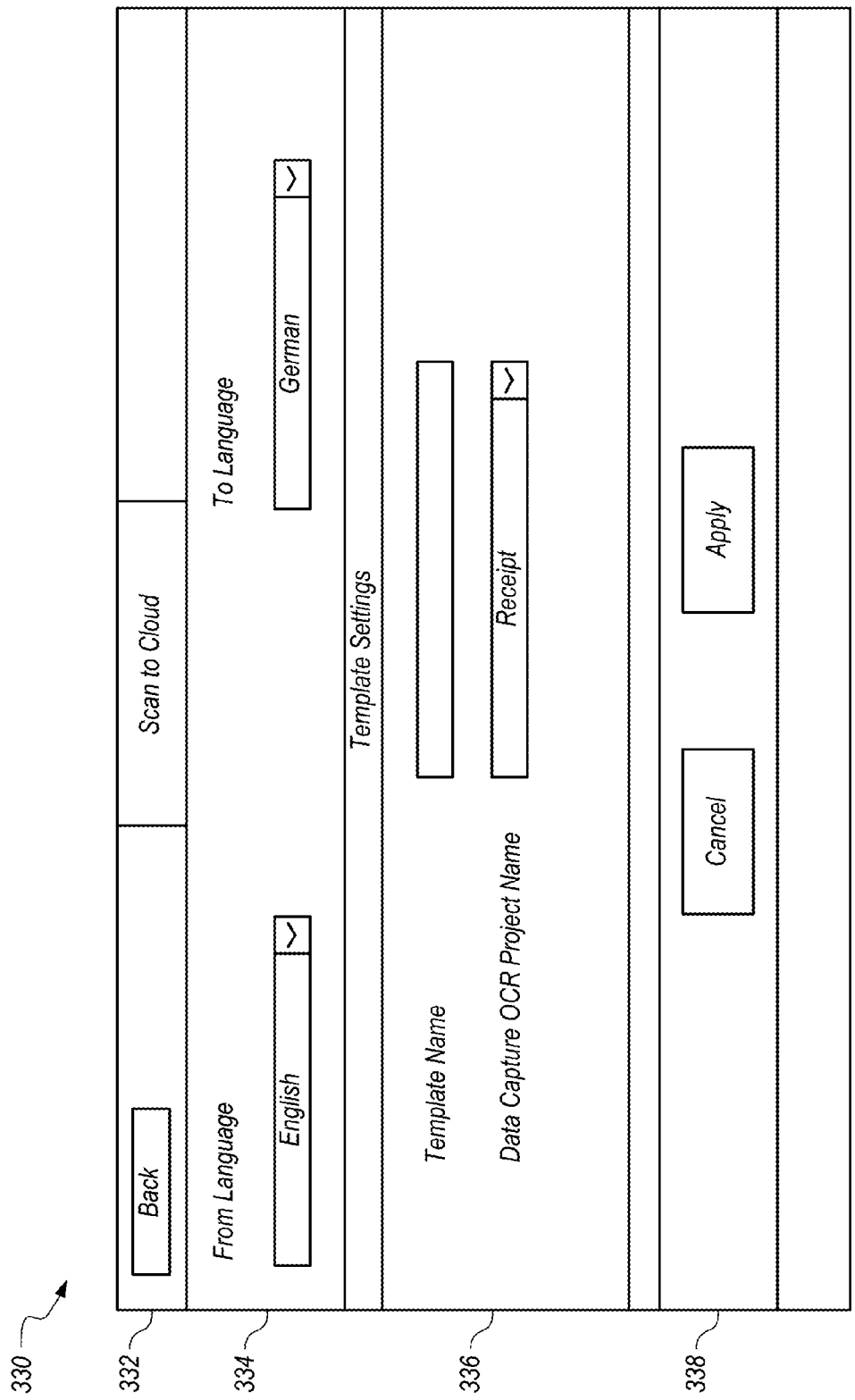
FIG. 3D depicts an example new template settings screen generated by an MFP that allows a user to create a new template.

Translation settings screen 320 also includes a control 328 for creating a new template. FIG. 3D depicts an example new template settings screen 330 generated by MFP 102 that allows a user to create a new template. New template settings screen 330 includes a control 332 for returning to registered users screen 300 and controls 334 for specifying a source language and a target language. New template settings screen 330 also includes controls 336 for specifying a template name and data capture OCR project name. New template settings screen 330 also includes controls 338 for canceling the creation of the new template or saving the new template. Template data for the new template may be stored locally on MFP 102 and also transmitted to language translation service 122 for storing in template data 130. When a new template is created via MFP 102, the template data for the new template may be supplemented with additional data via translation service configuration client 106, as described in more detail hereinafter. For example, the corresponding sets of keywords may be specified via translation service configuration client 106, that may have a more sophisticated and/or user friend user interface than MFP 102.

In step 208, the user initiates the scan-to-cloud (translation) workflow, for example, by selecting control 306.

In step 210, a scan-to-cloud (translation) workflow request is generated and transmitted to the language translation service. According to one embodiment, the request specifies at least electronic document data, if OCR has been performed at MFP 102, or scanned document data, if OCR has not yet been performed, a source (first) language, a target (second) language and a template. The request is transmitted by MFP 102 to language translation service 122. According to one embodiment, if OCR has not yet been performed, the request may first be transmitted to OCR process 118 to generate electronic document data based upon the scanned document data. The request and the resulting electronic document data are then transmitted to language translation service 122.

In step 212, language translation service 122 performs the translation of the electronic document data from the source (first) language into the target (second) language specified in the request, using the template specified in the request. The translation may be performed in different ways that may vary depending upon a particular embodiment.

Figure 4A:
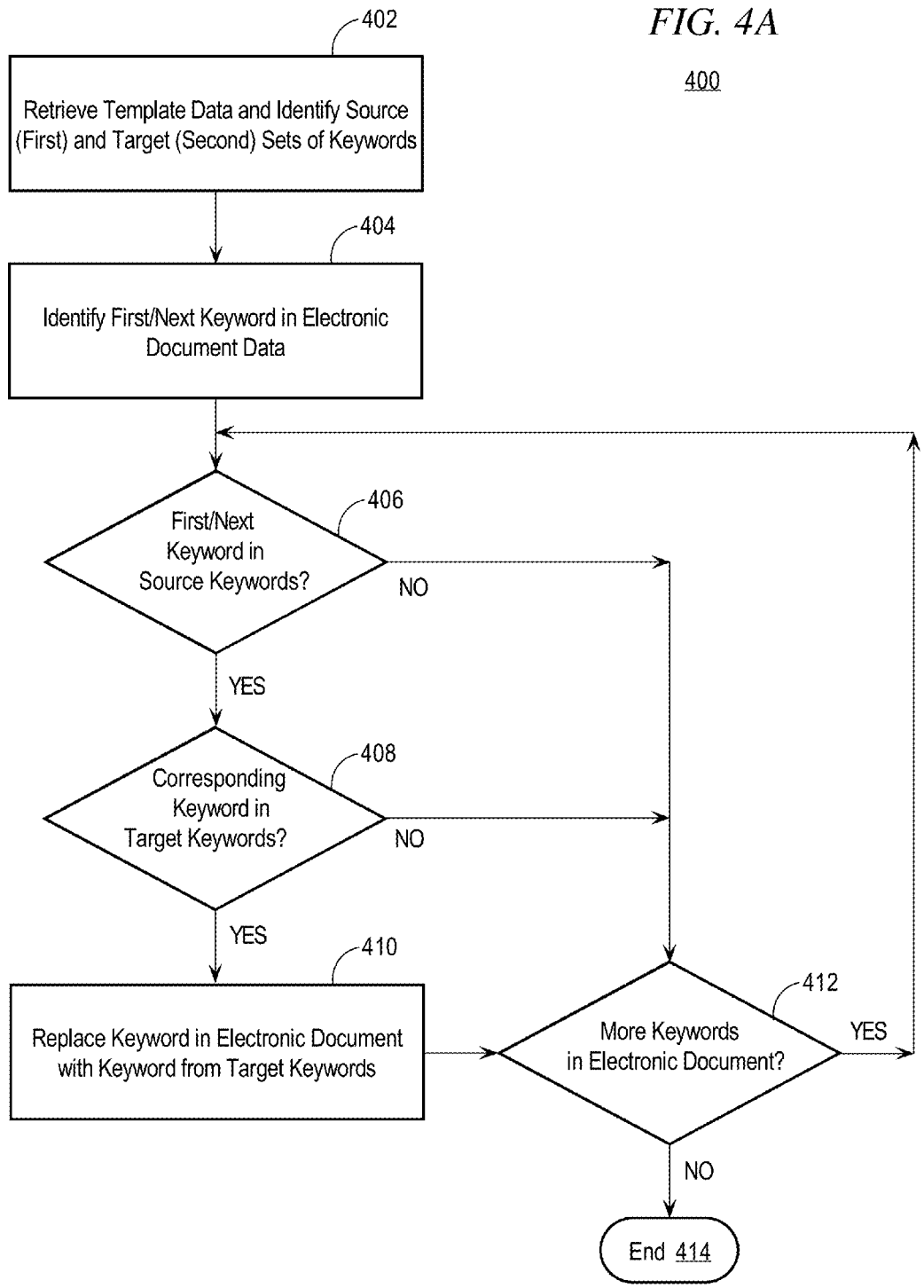
FIG. 4A is a flow diagram that depicts an approach for translating electronic documents using templates.

FIG. 4A is a flow diagram 400 that depicts an approach for translating electronic documents using templates. In step 402, template data is retrieved and source (first) language and target (second) language sets of keywords are identified. For example, language translation service 122 may retrieve template data 130 from storage 128.

FIG. 4B is a table 450 that depicts example keyword data in the form of a table. Embodiments are depicted in FIG. 4B and described herein in the context of at least some of the template data 130 being organized in the form of table 450, but this is provided for explanation purposes only and template data 130 does not have to be organized as a table. Table 450 includes three columns of keyword data that correspond to three different languages, identified in FIG. 4B as Language #1, Language #2 and Language #3. Table 450 includes seven rows of data, where each row may include corresponding keywords in each respective language. In Row 1 of table 450, the keyword "A1" in Language #1 has a corresponding keyword "A2" in Language #2 and a corresponding keyword "A3" in Language #3. Not all keywords have a corresponding keyword in all other languages. For example, in Row 3 of table 450, the keyword "C1" in Language #1 has a corresponding keyword of "C3" in Language #3, but does not have a corresponding keyword in Language #2. In the present example, if the translation request specifies a source (first) language of Language #1 and a target (second) language of Language #2, then the keyword data in Rows 1-7 for Language #1 and Language #2 is retrieved from storage 128.

In step 404, a first/next keyword is identified in the electronic document data. In the present example, the first/next keyword in the electronic document is "D1". In step 406, a determination is made whether the first/next keyword is included in the source (first) keywords. In the present example, a determination is made whether the keyword "D1" is included in Rows 1-7 of the Language #1 column. Since the keyword "D1" is included in Row 4 of table 450 for Language #1, then in step 408, a determination is made whether there is a corresponding keyword in the target (second) keywords. In the present example, a determination is made whether there is a corresponding keyword in Row 4 of table 450 for Language #2. In table 450, there is a keyword "D2" in Row 4 of table 450 for Language #2, so in step 410, the keyword in the electronic document is replaced with the corresponding keyword from the target keywords. In the present example, the keyword "D1" in the electronic document is replaced with the keyword "D2". Note that since a keyword is one or more words or phrases of any length, a single word may be replaced with one or more words or phrases of any length. Similarly, multiple words or phrases may be replaced with fewer words or phrases, or even a single word.

In step 412, a determination is made whether there are more keywords in the electronic document. Step 412 is also performed if in step 406, the first/next keyword is not included in the source (first) keywords, or if in step 408, there is no corresponding keyword in the target (second) keywords. If in step 412, there are more keywords in the electronic document, then the process continues with step 406. Otherwise, the process is complete in step 414 and the processed electronic document data is saved as translated electronic document data 134.

IV. Template Management

According to one embodiment, language translation service 122 provides various functionality for managing templates. The functionality may be accessed, for example, via a web-based graphical user interface provided by language translation service 122. Alternatively, language translation service 122 may provide an application program interface (API) for accessing the template management functionality.

Figure 5A:
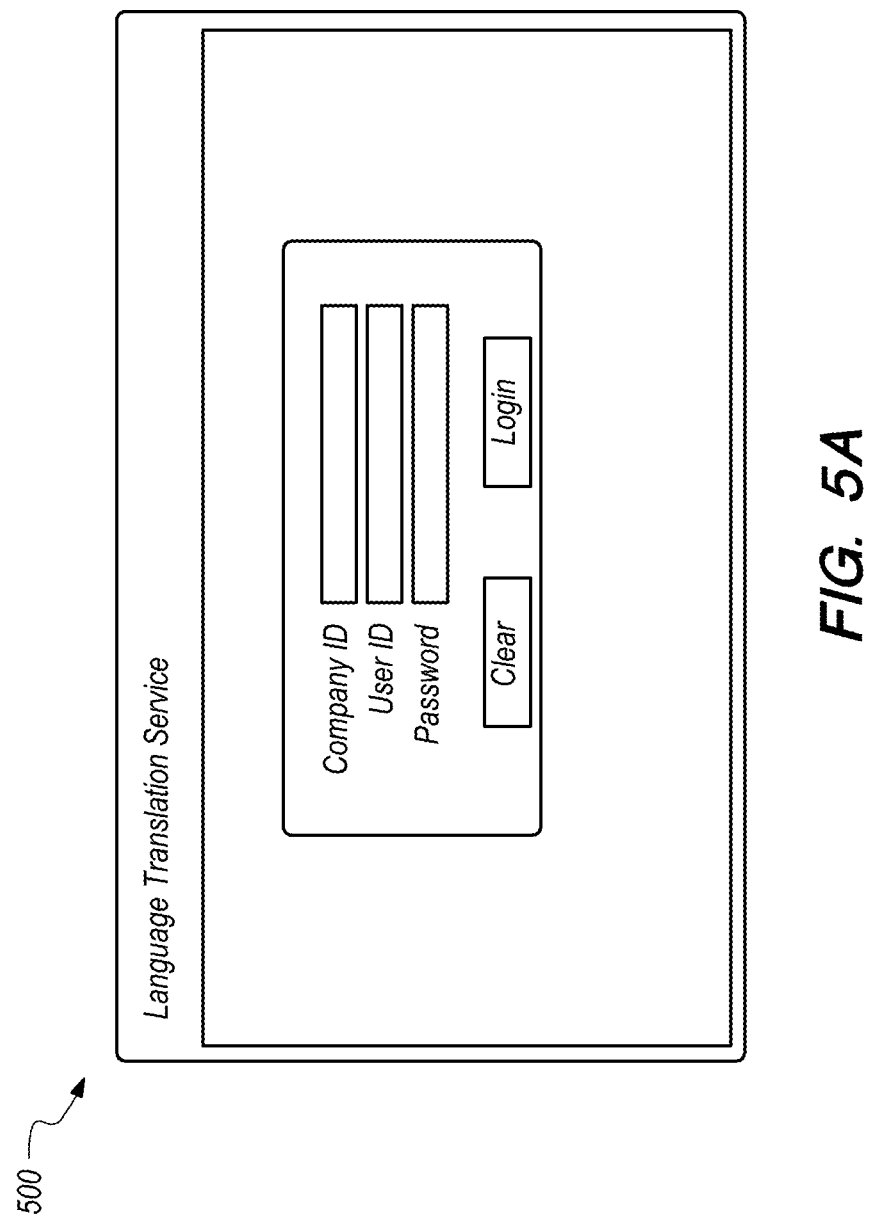
FIG. 5A depicts an example template management login screen for accessing the template management functionality provided by a language translation service.

FIG. 5A depicts an example template management login screen 500 for accessing the template management functionality provided by language translation service 122. A user of translation service configuration client 106 may access template management login screen 500 via a web browser on translation service configuration client 106. In the example depicted in FIG. 5A, a user is queried for an optional company ID and user credentials that include a user ID and a password. The user credentials are transmitted to and verified by language translation service 122.

FIG. 5B depicts an example template management screen 520 for managing templates. Template management screen 520 includes a list 522 of existing templates and information about the existing templates, including and owner of the template and a date that the template was last modified. Other information may be provided for the templates in list 522, depending upon a particular implementation. As one non-limiting example, list 522 may include a description or context for each template. This may be useful in situations where the name of the template by itself is not sufficient to indicate to a user the context of a template. Template management screen 520 includes controls 524 for creating a new template, editing an existing template, deleting an existing template and for accessing other options. Template management screen 520 also includes controls 526 for performing a translation review and various administrative functions.

Figure 5C:
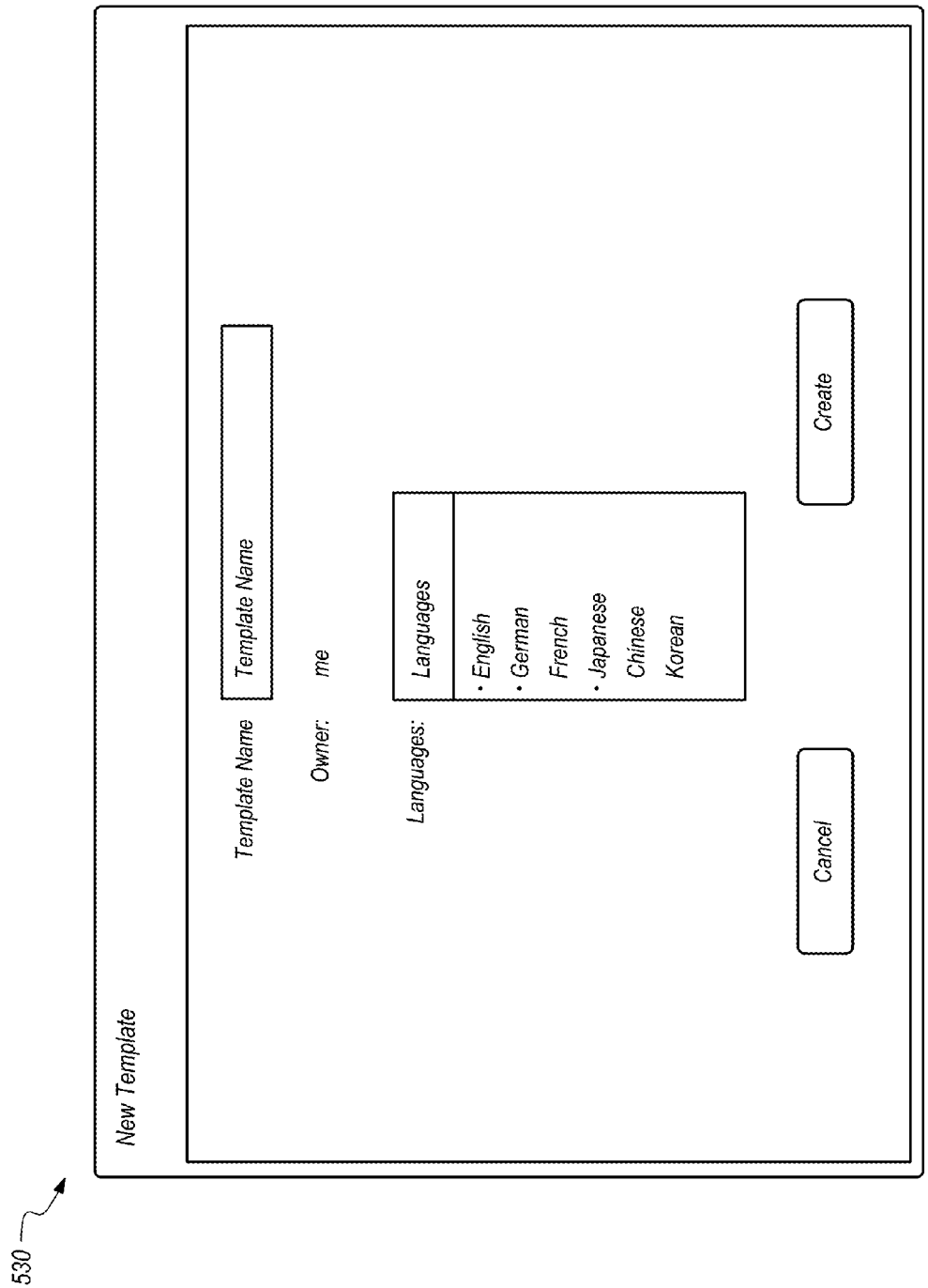
FIG. 5C depicts an example new template creation screen for creating a new template.

FIG. 5C depicts an example new template creation screen 530 for creating a new template in response to a user selecting the "New" control from controls 524 of FIG. 5B. As depicted in FIG. 5C, new template creation screen 530 includes controls for specifying a name for the new template, an owner of the template and two or more languages supported by the template. For example, a user may specify that new template is to support English, French and Japanese. Controls are also provided for confirming the creation of the new template or canceling the creation of the new template. After the template is created, the user may specify sets of corresponding keywords in each language, as described in more detail hereinafter.

FIG. 5D depicts an example template editing screen 540 for viewing and editing an existing template. Template editing screen 540 may be accessed from template management screen 520 of FIG. 5B by a user selecting a particular template from list 522 of templates and then selecting the "Edit" control from controls 524. In the present example, the user has requested to view and edit the second template from the list 522 named "Design Documents."

Template editing screen 540 includes controls 526 for returning to template management screen 520 for managing templates, performing a translation review and various administrative functions. Template editing screen 540 displays the name of the template, which is present example is the "Design Documents" template. Template editing screen 540 displays keyword sets 542, 544, 546 specified in the template. Keyword sets 542, 544, 546 include corresponding keywords in each of the languages supported by the template, where each line contains a corresponding keyword in each of the supported languages. In the example depicted in FIG. 5D, keyword sets 542, 544, 546 include corresponding keywords in English, German and French. Although in FIG. 5D, there is depicted a corresponding keyword in each of the supported languages this is not required and some keywords may have corresponding keywords in fewer than all of the languages supported by the template.

Template editing screen 540 includes keyword edit controls 548 for managing keywords for the current template including adding new keywords ("New"), editing existing keywords ("Edit"), deleting existing keywords ("Delete") and indicating completion (Done) of the keyword editing process. Selecting the "New" control 548 allows a user to add keywords to keyword sets 542, 544, 546. For example, selecting the "New" keyword edit control 548 may create a new line entry in keyword sets 542, 544, 546 and allow a user to enter corresponding keywords in each of the supported languages. Selecting the "Edit" keyword edit control 548 allows a user to edit existing keywords in keyword sets 542, 544, 546, either on a line-by-line or freeform basis. Selecting the "Delete" keyword edit control 548 allows a user to delete keywords in keyword sets 542, 544, 546, either on a line-by-line or freeform basis. Selecting of the "Done" control 548 indicates that a user has finished editing the keywords for the current template.

V. Translation Review

According to one embodiment, language translation service 122 provides a translation review function that allows users to view results of translations performed with templates to identify errors in the translations. The templates that were used to perform the translations can then be edited to address the identified errors, for example, by editing keywords in a template or by adding keywords to a template. The translation review function also allows users to perform "what if" scenarios by changing the target language and also by changing the template used to perform the translation.

FIG. 6A depicts an example translation review screen 600 for performing a translation review that may be accessed, for example, by a user selecting the "Translation Review" control from controls 526 of FIGS. 5B and 5D. Translation review screen 600 includes a list 602 of electronic documents that have been translated by language translation service 122. Translation review screen 600 also includes a "Review" control 604 that initiates a review of a particular electronic document selected from list 602. A user selects a particular electronic document from list 602 and then selects the "Review" control 604. In the present example, it is presumed that the user has selected the electronic document titled "ICE Design Document" and selected the "Review" control 604.

Figure 6B:
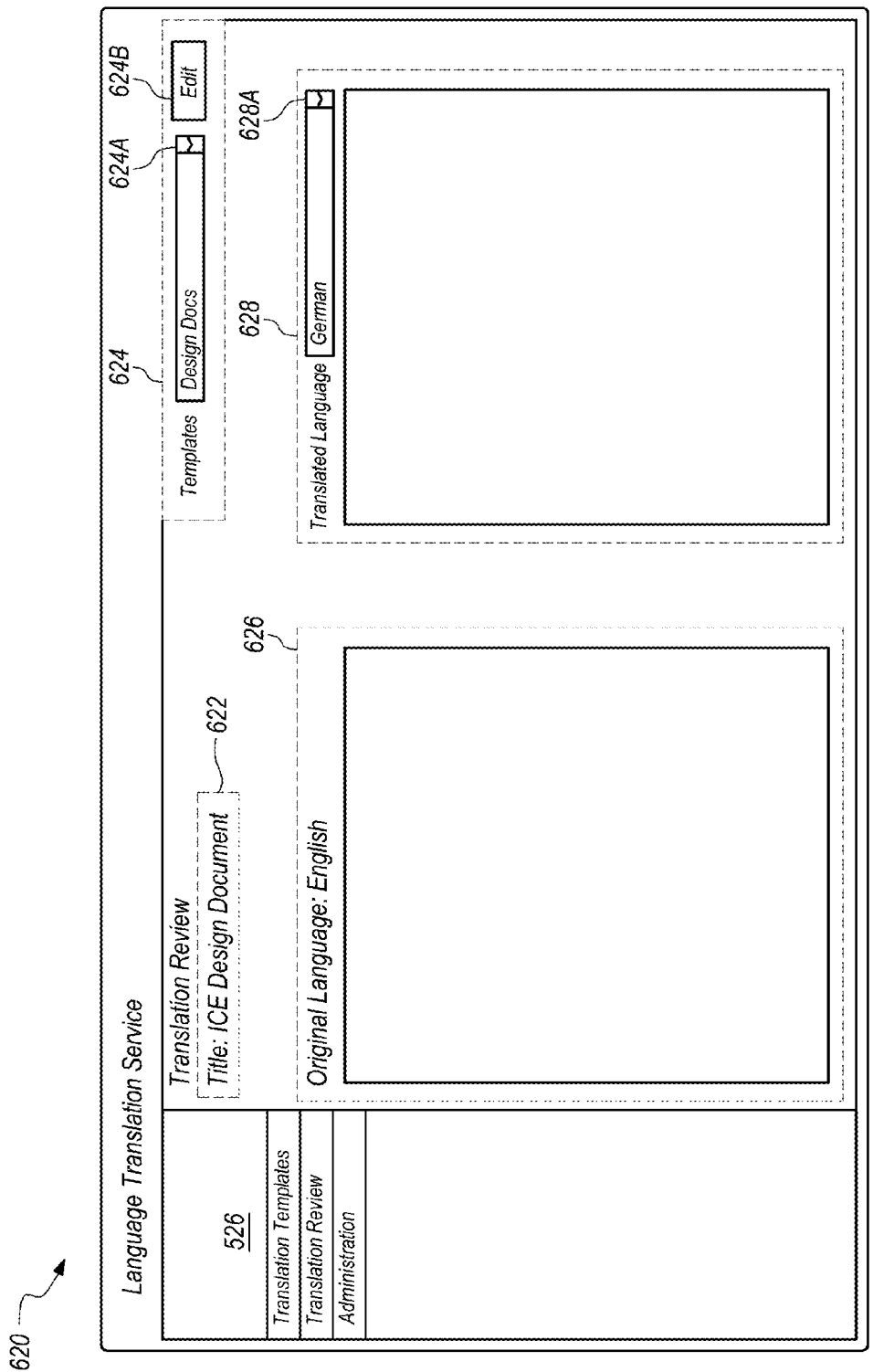
FIG. 6B depicts an example translation review results screen for displaying results of a translation review.

FIG. 6B depicts an example translation review results screen 620 for displaying results of a translation review. Translation review results screen 620 includes a title 622 of the electronic document being reviewed and template identifier/selection controls 624 that identify the particular template that was used to translate the electronic document. In the present example the template named "Design Docs" was used to translate the electronic document named "ICE Design Document." Template identifier/selection controls 624 include a template selection control 624a and a template edit control 624b that allow a user to select a different template to translate the electronic document and edit the current template respectively, as described in more detail hereinafter.

Translation review results screen 620 also includes a first region 626 that depicts words and phrases in the original language, i.e., the source (first) language, and a second region 628 that depicts corresponding words and phrases in the translated language, i.e., the target (second) language. This allows a user to easily visually identify translation errors and/or changes or additions that should be made to the template. A target (second) language control 628a allows a user to change the target (second) language to another language supported by the current template. For example, suppose that the current template "Design Docs" supports the languages English, German and French. The user may view, via translation review results screen 620 and more particularly, first region 626 and second region 628, the translation of the electronic document titled "ICE Design Document" from English to German, and also from English to French, by using the target (second) language control 628a to change the target (second) language from German to French. Thus, in this example, the pull-down menu options are populated based upon the languages supported by the current template. Alternatively, the pull-down menu may include all available languages and if a user selects a language not supported by the current template, then an error message may be displayed.

Figure 6C:
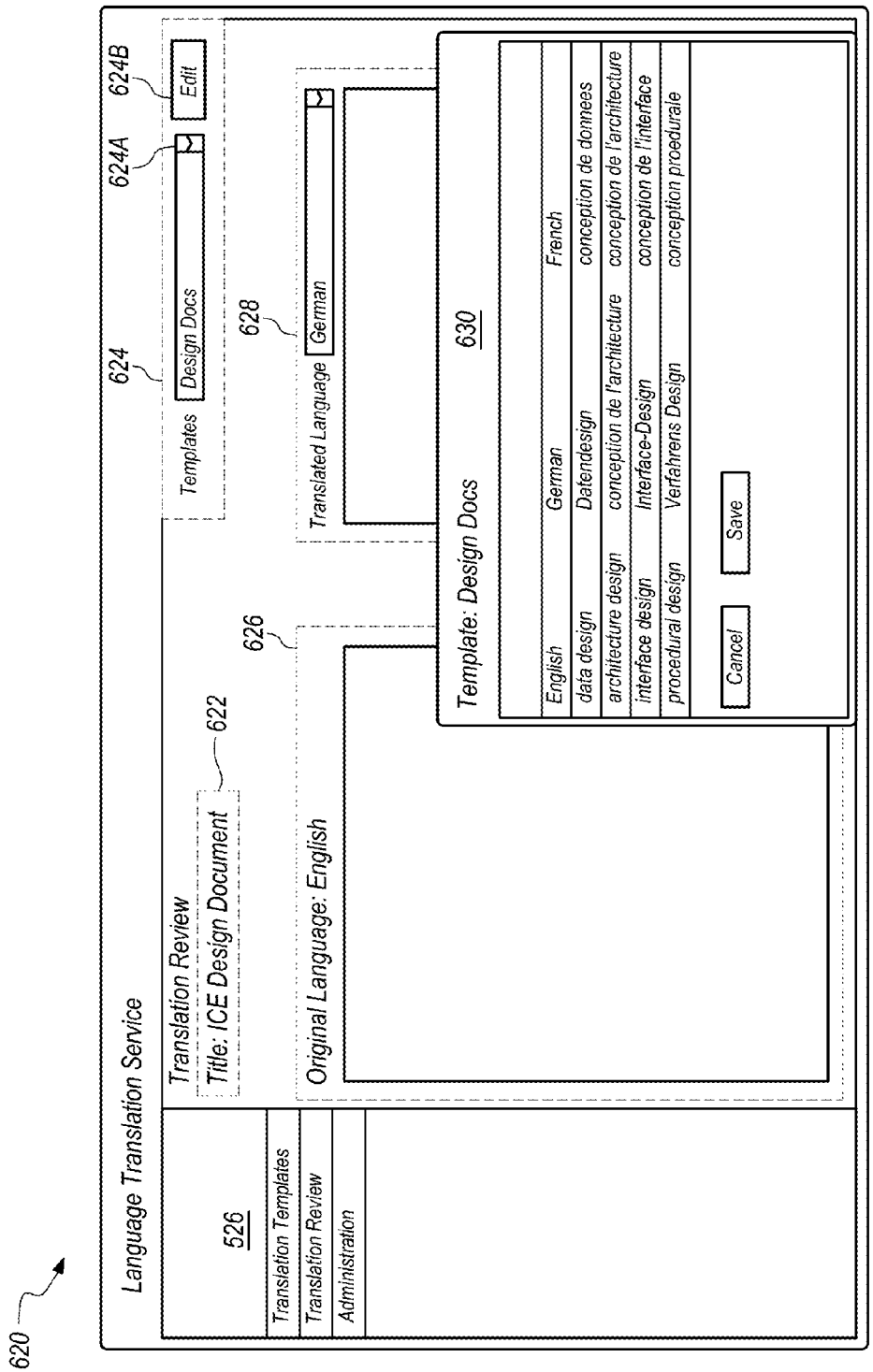
FIG. 6C depicts a template editing screen superimposed on translation review results screen in response to a user selecting a template edit control to edit the current template.

Once a user has determined changes to be made to a template, the user may select the template edit control 624b to edit the current template. FIG. 6C depicts a template editing screen 630 superimposed on translation review results screen 620 in response to a user selecting the template edit control 624b to edit the current template. Template editing screen 630 may include all of the functionality provided by template editing screen 540 of FIG. 5D. The template selection control 624a allows a user to select a different template to translate the current electronic document and view the results in first region 626 and second region 628. This allows a user to view how an electronic document is translated using different templates and languages, and then update the templates to improve the translation of the electronic document. The process may then be repeated with other electronic documents to provide further improvements and refinements to templates.

Figure 7:
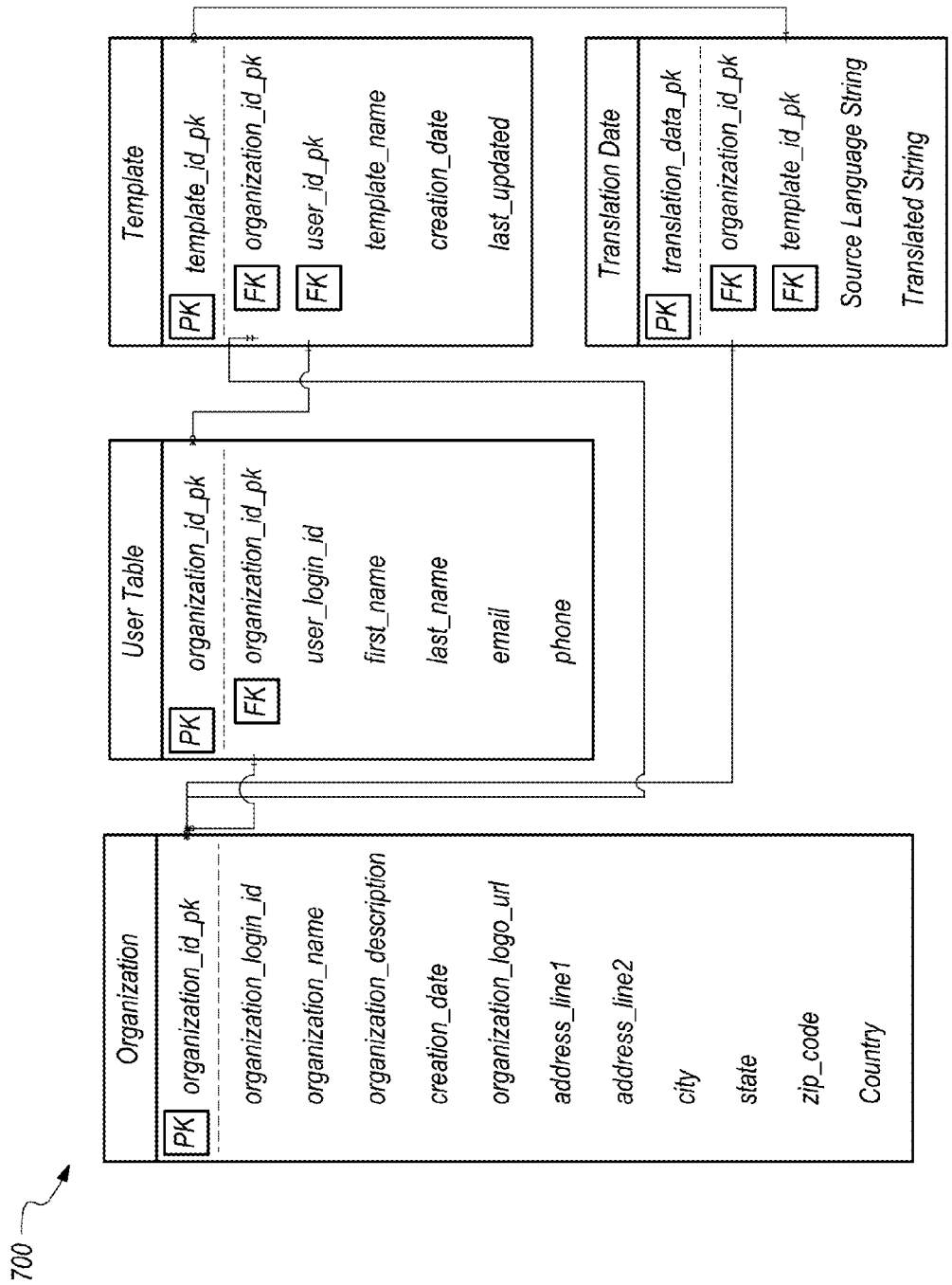
FIG. 7 depicts an example data schema for a business organization, users, templates and translation data.

FIG. 7 depicts an example data schema 700 for a business organization, users, templates and translation data.

VI. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
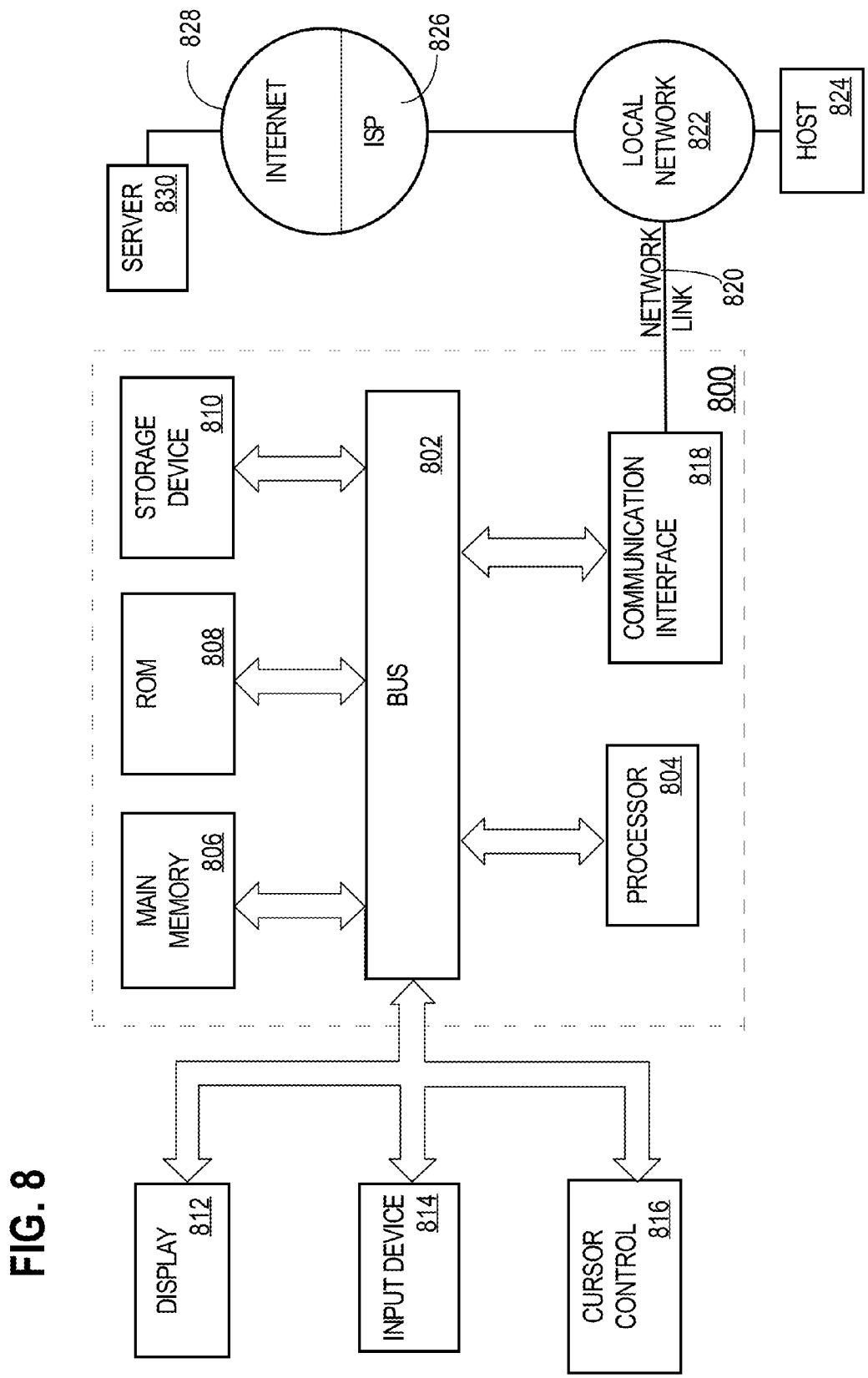
FIG. 8 is a block diagram that depicts an example computer system upon which embodiments may be implemented.

FIG. 8 is a block diagram that depicts an example computer system 800 upon which embodiments may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. Although bus 802 is illustrated as a single bus, bus 802 may comprise one or more buses. For example, bus 802 may include without limitation a control bus by which processor 804 controls other devices within computer system 800, an address bus by which processor 804 specifies memory locations of instructions for execution, or any other type of bus for transferring data or signals between components of computer system 800.

An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic or computer software which, in combination with the computer system, causes or programs computer system 800 to be a special-purpose machine. According to one embodiment, those techniques are performed by computer system 800 in response to processor 804 processing instructions stored in main memory 806. Such instructions may be read into main memory 806 from another computer-readable medium, such as storage device 810. Processing of the instructions contained in main memory 806 by processor 804 causes performance of the functionality described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 800, various computer-readable media are involved, for example, in providing instructions to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806. Common forms of computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of computer-readable media may be involved in storing instructions for processing by processor 804. For example, the instructions may initially be stored on a storage medium of a remote computer and transmitted to computer system 800 via one or more communications links. Bus 802 carries the data to main memory 806, from which processor 804 retrieves and processes the instructions. The instructions received by main memory 806 may optionally be stored on storage device 810 either before or after processing by processor 804.

Computer system 800 also includes a communication interface 818 coupled to bus 802. Communication interface 818 provides a communications coupling to a network link 820 that is connected to a local network 822. For example, communication interface 818 may be a modem to provide a data communication connection to a telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be processed by processor 804 as it is received, and/or stored in storage device 810, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
    one or more processors;
    one or more memories communicatively coupled to the one or more processors; and
    a language translation service executing on the apparatus and configured to:
        receive a request to translate an electronic document, wherein the request to translate the electronic document identifies the electronic document to be translated and specifies that the electronic document is to be translated from a first language to a second language that is different than the first language, and wherein the request to translate the electronic document further specifies a particular template from a plurality of templates to be used to translate the electronic document from the first language to the second language, wherein each template from the plurality of templates corresponds to a different context and at least two different templates, from the plurality of templates, have, for the same one or more keywords in a first language, different corresponding keywords in a second language, and wherein the particular template corresponds to a particular context and includes at least a first plurality of keywords in the first language and a corresponding second plurality of keywords in the second language, and
        generate a translated electronic document by processing the electronic document using the first plurality of keywords in the first language and the corresponding second plurality of keywords in the second language included in the particular template.

2. The apparatus of claim 1, wherein the language translation service executing on the apparatus is further configured to generate a translated electronic document by processing the electronic document using the particular template by:
    identifying a particular keyword in the electronic document data,
    determining whether the particular keyword is included in the first plurality of keywords,
    in response to determining that the particular keyword is included in the first plurality of keywords, then:
        determining whether the second plurality of keywords in the second language includes a replacement keyword that corresponds to the particular keyword included in the first plurality of keywords,
        in response to determining that the second plurality of keywords in the second language includes a replacement keyword that corresponds to the particular keyword included in the first plurality of keywords in the first language, then replacing the particular keyword in the electronic document data with the replacement keyword that corresponds to the particular keyword included in the first plurality of keywords in the first language.

3. The apparatus of claim 1, wherein the language translation service executing on the apparatus is further configured to:
    generate and transmit to a client device graphical user interface data which, when processed at the client device, cause a plurality of graphical user interface objects to be displayed at the client device, wherein the plurality of graphical user interface objects indicate the plurality of templates and one or more controls for managing the plurality of templates including a control for creating a new template, receive a request to create a new template, wherein the request to create a new template specifies a template name and two or more languages supported by the new template, and in response to receiving the request to create a new template, wherein the request to create a new template specifies a template name and two or more languages supported by the new template, generating and storing template data for the new template, wherein the template data for the new template specifies the template name and the two or more languages supported by the new template.

4. The apparatus of claim 3, wherein:

the plurality of graphical user interface objects allow the user to specify a first new plurality of keywords in a third language and a corresponding second new plurality of keywords in a fourth language, and the language translation service executing on the apparatus is further configured to cause the first new plurality of keywords in the third language and the corresponding second new plurality of keywords in the fourth language to be stored in the template data for the new template.

5. The apparatus of claim 1, wherein:

the language translation service executing on the apparatus is further configured to generate and transmit, to a client device, graphical user interface data which, when processed at the client device, cause a plurality of graphical user interface objects to be displayed at the client device, wherein the plurality of graphical user interface objects allow the user to edit the first plurality of keywords in the first language to create a revised first plurality of keywords in the first language and the second plurality of keywords in the second language to create a revised second plurality of keywords in the second language, and the language translation service executing on the apparatus is further configured to cause the revised first plurality of keywords in the first language and the corresponding revised second plurality of keywords in the second language to be stored in template data for the particular template.

6. The apparatus of claim 1, wherein the language translation service executing on the apparatus is further configured to:

generate and transmit to a client device graphical user interface data which, when processed at the client device, cause a plurality of graphical user interface objects to be displayed at the client device, wherein the plurality of graphical user interface objects display one or more portions of the electronic document in the first language and one or more corresponding portions of the translated electronic document in the second language.

7. The apparatus of claim 6, wherein:

the plurality of graphical user interface objects allow the user to specify a third language supported by the particular template, wherein the particular template includes a third plurality of keywords in the third language that correspond to the first plurality of keywords in the first language, in response to a user selection, from the plurality of graphical user interface objects, of a particular graphical user interface object that corresponds to the third language supported by the particular template, generate a second translated electronic document by processing the electronic document using the first plurality of keywords in the first language and the corresponding third plurality of keywords in the third language included in the particular template, and generate and transmit to a client device additional graphical user interface data which, when processed at the client device, cause a second plurality of graphical user interface objects to be displayed at the client device, wherein the second plurality of graphical user interface objects display one or more portions of the second translated electronic document in the third language.

8. The apparatus of claim 6, wherein:

the plurality of graphical user interface objects allow the user to specify a second particular template from the plurality of templates to be used to translate the electronic document from the first language to the second language, the second particular template corresponds to a second particular context that is different than the particular context, and wherein the second particular template includes at least a first plurality of keywords in the first language and a corresponding second plurality of keywords in the second language, in response to a user selection, from the plurality of graphical user interface objects, of a particular graphical user interface object that corresponds to the second particular template, generate a second translated electronic document by processing the electronic document using the first plurality of keywords in the first language and the corresponding third plurality of keywords in the third language included in the second particular template, and generate and transmit to a client device additional graphical user interface data which, when processed at the client device, cause a second plurality of graphical user interface objects to be displayed at the client device, wherein the second plurality of graphical user interface objects display one or more portions of the second translated electronic document in the second language.

9. One or more non-transitory computer-readable media storing instructions which, when processed by one or more processors, cause:

a language translation service executing on an apparatus to:

receive a request to translate an electronic document, wherein the request to translate the electronic document identifies the electronic document to be translated and specifies that the electronic document is to be translated from a first language to a second language that is different than the first language, and wherein the request to translate the electronic document further specifies a particular template from a plurality of templates to be used to translate the electronic document from the first language to the second language, wherein each template from the plurality of templates corresponds to a different context and at least two different templates, from the plurality of templates, have, for the same one or more keywords in a first language, different corresponding keywords in a second language, and wherein the particular template corresponds to a particular context and includes at least a first plurality of keywords in the first language and a corresponding second plurality of keywords in the second language, and generate a translated electronic document by processing the electronic document using the first plurality of keywords in the first language and the corresponding second plurality of keywords in the second language included in the particular template.

10. The one or more non-transitory computer-readable media of claim 9, further comprising additional instructions which, when processed by the one or more processors, cause the language translation service executing on the apparatus to generate a translated electronic document by processing the electronic document using the particular template by:
   identifying a particular keyword in the electronic document data,
   determining whether the particular keyword is included in the first plurality of keywords,
   in response to determining that the particular keyword is included in the first plurality of keywords, then:
      determining whether the second plurality of keywords in the second language includes a replacement keyword that corresponds to the particular keyword included in the first plurality of keywords,
      in response to determining that the second plurality of keywords in the second language includes a replacement keyword that corresponds to the particular keyword included in the first plurality of keywords in the first language, then replacing the particular keyword in the electronic document data with the replacement keyword that corresponds to the particular keyword included in the first plurality of keywords in the first language.

11. The one or more non-transitory computer-readable media of claim 9, further comprising additional instructions which, when processed by the one or more processors, cause the language translation service executing on the apparatus to:
   generate and transmit to a client device graphical user interface data which, when processed at the client device, cause a plurality of graphical user interface objects to be displayed at the client device, wherein the plurality of graphical user interface objects indicate the plurality of templates and one or more controls for managing the plurality of templates including a control for creating a new template,
   receive a request to create a new template, wherein the request to create a new template specifies a template name and two or more languages supported by the new template, and
   in response to receiving the request to create a new template, wherein the request to create a new template specifies a template name and two or more languages supported by the new template, generating and storing template data for the new template, wherein the template data for the new template specifies the template name and the two or more languages supported by the new template.

12. The one or more non-transitory computer-readable media of claim 11, wherein:
   the plurality of graphical user interface objects allow the user to specify a first new plurality of keywords in a third language and a corresponding second new plurality of keywords in a fourth language, and
   the one or more non-transitory computer-readable media further comprise additional instructions which, when processed by the one or more processors, cause the language translation service executing on the apparatus to cause the first new plurality of keywords in the third language and the corresponding second new plurality of keywords in the fourth language to be stored in the template data for the new template.

13. The one or more non-transitory computer-readable media of claim 9, wherein:
   the language translation service executing on the apparatus is further configured to generate and transmit, to a client device, graphical user interface data which, when processed at the client device, cause a plurality of graphical user interface objects to be displayed at the client device, wherein the plurality of graphical user interface objects allow the user to edit the first plurality of keywords in the first language to create a revised first plurality of keywords in the first language and the second plurality of keywords in the second language to create a revised second plurality of keywords in the second language, and
   the one or more non-transitory computer-readable media further comprise additional instructions which, when processed by the one or more processors, cause the language translation service executing on the apparatus to cause the revised first plurality of keywords in the first language and the corresponding revised second plurality of keywords in the second language to be stored in template data for the particular template.

14. The one or more non-transitory computer-readable media of claim 9, further comprising additional instructions which, when processed by the one or more processors, cause the language translation service executing on the apparatus to:
   generate and transmit to a client device graphical user interface data which, when processed at the client device, cause a plurality of graphical user interface objects to be displayed at the client device, wherein the plurality of graphical user interface objects display one or more portions of the electronic document in the first language and one or more corresponding portions of the translated electronic document in the second language.

15. The one or more non-transitory computer-readable media of claim 14, wherein:
   the plurality of graphical user interface objects allow the user to specify a third language supported by the particular template, wherein the particular template includes a third plurality of keywords in the third language that correspond to the first plurality of keywords in the first language,
   in response to a user selection, from the plurality of graphical user interface objects, of a particular graphical user interface object that corresponds to the third language supported by the particular template, generate a second translated electronic document by processing the electronic document using the first plurality of keywords in the first language and the corresponding third plurality of keywords in the third language included in the particular template, and
   generate and transmit to a client device additional graphical user interface data which, when processed at the client device, cause a second plurality of graphical user interface objects to be displayed at the client device, wherein the second plurality of graphical user interface objects display one or more portions of the second translated electronic document in the third language.

16. The one or more non-transitory computer-readable media of claim 14, wherein:
   the plurality of graphical user interface objects allow the user to specify a second particular template from the plurality of templates to be used to translate the electronic document from the first language to the second language, the second particular template corresponds to a second particular context that is different than the particular context, and wherein the second particular template includes at least a first plurality of keywords in the first language and a corresponding second plurality of keywords in the second language, in response to a user selection, from the plurality of graphical user interface objects, of a particular graphical user interface object that corresponds to the second particular template, generate a second translated electronic document by processing the electronic document using the first plurality of keywords in the first language and the corresponding third plurality of keywords in the third language included in the second particular template, and generate and transmit to a client device additional graphical user interface data which, when processed at the client device, cause a second plurality of graphical user interface objects to be displayed at the client device, wherein the second plurality of graphical user interface objects display one or more portions of the second translated electronic document in the second language.

17. A computer-implemented method comprising:

receiving, by a language translation service executing on an apparatus, a request to translate an electronic document, wherein the request to translate the electronic document identifies the electronic document to be translated and specifies that the electronic document is to be translated from a first language to a second language that is different than the first language, and wherein the request to translate the electronic document further specifies a particular template from a plurality of templates to be used to translate the electronic document from the first language to the second language, wherein each template from the plurality of templates corresponds to a different context and at least two different templates, from the plurality of templates, have, for the same one or more keywords in a first language, different corresponding keywords in a second language, and wherein the particular template corresponds to a particular context and includes at least a first plurality of keywords in the first language and a corresponding second plurality of keywords in the second language, and generating, by the language translation service executing on an apparatus, a translated electronic document by processing the electronic document using the first plurality of keywords in the first language and the corresponding second plurality of keywords in the second language included in the particular template.

18. The computer-implemented method of claim 17, further comprising the language translation service executing on the apparatus generating the translated electronic document by processing the electronic document using the particular template by:

identifying a particular keyword in the electronic document data, determining whether the particular keyword is included in the first plurality of keywords, in response to determining that the particular keyword is included in the first plurality of keywords, then:

determining whether the second plurality of keywords in the second language includes a replacement keyword that corresponds to the particular keyword included in the first plurality of keywords, in response to determining that the second plurality of keywords in the second language includes a replacement keyword that corresponds to the particular keyword included in the first plurality of keywords in the first language, then replacing the particular keyword in the electronic document data with the replacement keyword that corresponds to the particular keyword included in the first plurality of keywords in the first language.

19. The computer-implemented method of claim 17, further comprising:

generating and transmitting, by the language translation service executing on the apparatus, to a client device graphical user interface data which, when processed at the client device, cause a plurality of graphical user interface objects to be displayed at the client device, wherein the plurality of graphical user interface objects indicate the plurality of templates and one or more controls for managing the plurality of templates including a control for creating a new template, receiving, by the language translation service executing on the apparatus, a request to create a new template, wherein the request to create a new template specifies a template name and two or more languages supported by the new template, and in response to receiving the request to create a new template, wherein the request to create a new template specifies a template name and two or more languages supported by the new template, generating and storing, by the language translation service executing on the apparatus, template data for the new template, wherein the template data for the new template specifies the template name and the two or more languages supported by the new template.

20. The computer-implemented method of claim 19, wherein:

the plurality of graphical user interface objects allow the user to specify a first new plurality of keywords in a third language and a corresponding second new plurality of keywords in a fourth language, and the computer-implemented method further comprises causing, by the language translation service executing on the apparatus, to cause the first new plurality of keywords in the third language and the corresponding second new plurality of keywords in the fourth language to be stored in the template data for the new template.

* * * * *